CAPRON & DAVIS.
Potato-Digger.
No. 25,721.                                                   Patented Oct. 11, 1859.
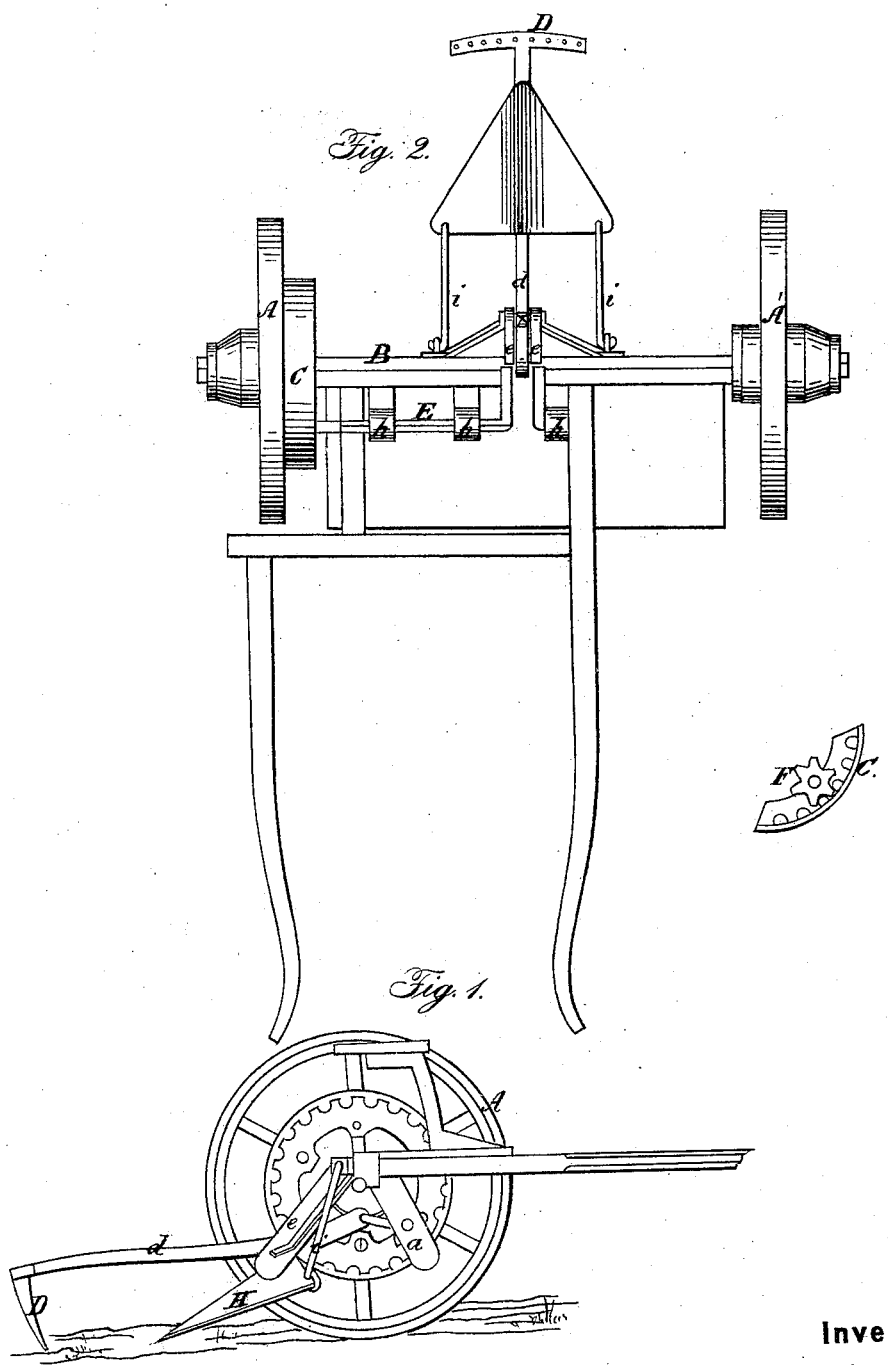
Witnesses:
Inventor:

UNITED STATES PATENT OFFICE.

A. S. CAPRON AND D. S. DAVIS, OF GRASS LAKE, MICHIGAN.

IMPROVEMENT IN POTATO-DIGGERS.

Specification forming part of Letters Patent No. 25,721, dated October 11, 1859.

*To all whom it may concern:*

Be it known that we, A. S. CAPRON and D. S. DAVIS, of Grass Lake, in the county of Jackson and State of Michigan, have invented certain new and useful Improvements in Potato-Diggers; and we do hereby declare that the following is a full, clear, and exact description of the same, reference being had to the accompanying drawings, and to the letters of reference marked thereon.

The nature of our invention consists in arranging the several parts of the machine together substantially in the manner hereinafter described.

In the drawings, Figure 1 represents a longitudinal section. Fig. 2 represents a bottom view.

In the figures, A A represent two wheels, which are secured in the usual manner upon an axle, B. C represents a smaller wheel, secured to one of the wheels A, said wheel C being provided with cog-gearing on its inner rim.

E represents a crank-shaft, which is supported in bearings *h h h*. To one end of this crank-shaft there is attached a pinion, which works in the gearing upon wheel C.

D represents a rake, which is secured to the handle *d*, said handle being secured at one end to the crank on shaft E. The handle *d* passes between two guides, *e e*, and rests upon a roller, *x*, which is secured between said guides.

H represents an apron, which is connected to the axle B by means of two long hooks, *i i*. This apron drags upon the ground behind the machine in but front of the rake.

When this machine is set in motion the wheel C communicates motion to the pinion F, the crank-shaft E, and thence to the rake D. It will be seen that the handle of the rake resting upon the roller *x*, and operated by means of the crank on shaft E, the rake will have a motion given to it similar to the movement of the ordinary hand-rake. It will be dragged along on the ground, then raised and pushed back, and then dragged along on the ground again. The apron being in the shape of the blade of a common shovel-plow, when the rake draws the potatoes up toward and upon the apron they fall off on each side of said apron. The rake each time it is pushed back commences to rake at about the point it left off when it was raised by the crank.

This machine, it will be seen, rakes the potatoes from the furrow and, freeing them from the dirt, distributes them on each side of the furrow and of the apron.

Having thus fully described our invention, what we claim as new, and desire to secure by Letters Patent, is—

The arrangement of axle B, wheels A A', and wheel C, pinion F, crank-shaft E, guides *e e*, roller *x*, rake D, apron H, and hooks *i i*, the whole being connected together and operating substantially as and for the purpose specified.

A. S. CAPRON.
D. S. DAVIS.

Witnesses:
E. E. ATKINSON,
HIRAM BECKWITH.